US007853556B2

(12) United States Patent
Swaminathan et al.

(10) Patent No.: US 7,853,556 B2
(45) Date of Patent: Dec. 14, 2010

(54) NAVIGATING A SOFTWARE PROJECT RESPOSITORY (75) Inventors: Kishore Swaminathan, Clarendon Hills, IL (US); Scott W. Kurth, Wheeling, IL (US); William N. Milleker, Riverside, IL (US)

(73) Assignee: Accenture Global Services Limited, Dublin (IE)

( * ) Notice: Subject to any disclaimer, the term of this patent is extended or adjusted under 35 U.S.C. 154(b) by 134 days.

(21) Appl. No.: 12/150,974

(22) Filed: May 2, 2008

(65) Prior Publication Data

US 2008/0281841 A1 Nov. 13, 2008

Related U.S. Application Data (62) Division of application No. 10/661,805, filed on Sep. 12, 2003, now Pat. No. 7,383,269.

(51) Int. Cl.
*G06F 7/00* (2006.01)
(52) U.S. Cl. .................. 707/602; 707/616; 707/625; 707/700; 707/755
(58) Field of Classification Search .............. 707/104.1, 707/3, 5, 694, 755, 602, 625; 715/501.1; 702/20; 705/1.1, 7, 10
See application file for complete search history.

(56) References Cited

U.S. PATENT DOCUMENTS

| | | | |
|---|---|---|---|
| 5,265,065 A | 11/1993 | Turtle | |
| 5,276,805 A | 1/1994 | Hamaguchi | |
| 5,499,334 A | 3/1996 | Staab | |
| 5,506,984 A | 4/1996 | Miller | |
| 5,535,325 A | 7/1996 | Cattell et al. | |
| 5,590,250 A | 12/1996 | Lamping et al. | |
| 5,608,900 A | 3/1997 | Dockter et al. | |
| 5,619,632 A | 4/1997 | Lamping et al. | |
| 5,644,740 A | 7/1997 | Kiuchi et al. | |
| 5,659,724 A | 8/1997 | Borgida et al. | |
| 5,745,895 A | 4/1998 | Bingham et al. | |
| 5,768,578 A | 6/1998 | Kirk et al. | |
| 5,794,257 A | 8/1998 | Liu et al. | |
| 5,801,702 A | 9/1998 | Dolan et al. | |
| 5,949,968 A | 9/1999 | Gentile | |
| 5,953,723 A | 9/1999 | Linoff et al. | |

(Continued)

FOREIGN PATENT DOCUMENTS

EP   0 902 380 A2   3/1998

(Continued)

OTHER PUBLICATIONS

B. Boguraev et al., "Salience-based content characterisation of text documents", ACM, 1997, pp. 2-9.*

(Continued)

*Primary Examiner*—Thuy N Pardo (57) ABSTRACT

A system for analyzing a document in a repository is provided. The system receives a document that includes data and a document type. The document type has an associated physical structure. The system determines a logical structure of the document based in part on the data and selects a subset of the data based on at least one of the group including the associated physical structure and the logical structure. The system also stores a document segment that includes the selected subset of the data.

11 Claims, 9 Drawing Sheets

U.S. PATENT DOCUMENTS

| | | | |
|---|---|---|---|
| 5,956,688 A | 9/1999 | Kokubo et al. | |
| 5,960,430 A | 9/1999 | Haimowitz et al. | |
| 5,983,218 A | 11/1999 | Syeda-Mahmood | |
| 5,999,908 A * | 12/1999 | Abelow | 705/7 |
| 6,012,055 A | 1/2000 | Campbell et al. | |
| 6,018,735 A | 1/2000 | Hunter | |
| 6,031,537 A | 2/2000 | Hugh | |
| 6,035,300 A | 3/2000 | Cason et al. | |
| 6,037,944 A | 3/2000 | Hugh | |
| 6,038,668 A | 3/2000 | Chimpan et al. | |
| 6,052,693 A | 4/2000 | Smith et al. | |
| 6,141,662 A | 10/2000 | Jeyachandran | |
| 6,166,736 A | 12/2000 | Hugh | |
| 6,166,739 A | 12/2000 | Hugh | |
| 6,233,571 B1 | 5/2001 | Egger et al. | |
| 6,236,994 B1 | 5/2001 | Swartz et al. | |
| 6,256,032 B1 | 7/2001 | Hugh | |
| 6,289,353 B1 | 9/2001 | Hazelhurst et al. | |
| 6,330,007 B1 | 12/2001 | Isreal et al. | |
| 6,356,897 B1 | 3/2002 | Gusack | |
| 6,397,231 B1 | 5/2002 | Salisbury et al. | |
| 6,425,525 B1 | 7/2002 | Swaminathan et al. | |
| 6,434,556 B1 | 8/2002 | Levin et al. | |
| 6,434,558 B1 | 8/2002 | MacLeod et al. | |
| 6,446,061 B1 | 9/2002 | Doerre et al. | |
| 6,446,076 B1 | 9/2002 | Burkey et al. | |
| 6,460,034 B1 | 10/2002 | Wical | |
| 6,487,545 B1 | 11/2002 | Wical | |
| 6,499,026 B1 | 12/2002 | Rivette et al. | |
| 6,564,209 B1 | 5/2003 | Dempski et al. | |
| 6,581,058 B1 | 6/2003 | Fayyad et al. | |
| 6,582,474 B2 | 6/2003 | LaMarca et al. | |
| 6,721,726 B1 | 4/2004 | Swaminathan et al. | |
| 6,727,927 B1 | 4/2004 | Dempski et al. | |
| 6,840,442 B2 | 1/2005 | Swaminathan et al. | |
| 6,900,807 B1 | 5/2005 | Liongosari et al. | |
| 6,996,774 B2 | 2/2006 | Liongosari et al. | |
| 7,000,032 B2 | 2/2006 | Kloba et al. | |
| 7,031,961 B2 | 4/2006 | Pitkow et al. | |
| 7,047,236 B2 | 5/2006 | Conroy et al. | |
| 7,099,854 B2 | 8/2006 | Liongosari | |
| 7,222,078 B2 * | 5/2007 | Abelow | 705/1.1 |
| 7,240,051 B2 | 7/2007 | Imaichi et al. | |
| 7,321,886 B2 | 1/2008 | Swaminathan et al. | |
| 7,620,565 B2 * | 11/2009 | Abelow | 705/10 |
| 2002/0007284 A1 | 1/2002 | Schurenberg et al. | |
| 2002/0065856 A1 | 5/2002 | Kisiel | |
| 2003/0009295 A1 * | 1/2003 | Markowitz et al. | 702/20 |
| 2003/0182310 A1 * | 9/2003 | Charnock et al. | 707/104.1 |
| 2004/0015486 A1 | 1/2004 | Liang et al. | |
| 2004/0090472 A1 | 5/2004 | Risch et al. | |
| 2004/0122689 A1 | 6/2004 | Dailey et al. | |
| 2004/0186824 A1 | 9/2004 | Delic et al. | |
| 2004/0186842 A1 | 9/2004 | Wesemann | |
| 2004/0267729 A1 | 12/2004 | Swaminathan et al. | |
| 2005/0043940 A1 | 2/2005 | Elder | |
| 2005/0060643 A1 * | 3/2005 | Glass et al. | 715/501.1 |
| 2005/0065930 A1 | 3/2005 | Swaminathan et al. | |
| 2005/0108200 A1 * | 5/2005 | Meik et al. | 707/3 |
| 2005/0149538 A1 | 7/2005 | Singh et al. | |
| 2006/0179024 A1 | 8/2006 | Bechtel et al. | |
| 2006/0179025 A1 | 8/2006 | Bechtel et al. | |
| 2006/0179026 A1 | 8/2006 | Bechtel et al. | |
| 2006/0179027 A1 | 8/2006 | Bechtel et al. | |
| 2006/0179067 A1 | 8/2006 | Bechtel et al. | |
| 2006/0179069 A1 | 8/2006 | Bechtel et al. | |
| 2007/0156677 A1 * | 7/2007 | Szabo | 707/5 |

FOREIGN PATENT DOCUMENTS

| | | |
|---|---|---|
| EP | 0 950 964 A2 | 10/1999 |
| EP | 0 902 380 A3 | 11/1999 |
| EP | 0 950 964 A3 | 11/1999 |
| EP | 1039265 A1 | 9/2000 |
| EP | 1667034 A2 | 6/2006 |
| EP | 1667034 A3 | 2/2007 |
| WO | WO 97/38376 A2 | 10/1997 |
| WO | WO 97/38376 A3 | 12/1997 |
| WO | WO 98/57277 A1 | 12/1998 |
| WO | WO 01/37120 A2 | 5/2001 |
| WO | WO 02/21259 A | 3/2002 |
| WO | WO 02/071273 A2 | 9/2002 |
| WO | WO 02/071273 A3 | 9/2002 |
| WO | WO 03/069506 A | 8/2003 |
| WO | WO 03/069506 A2 | 8/2003 |
| WO | WO 03/069506 A3 | 6/2004 |

OTHER PUBLICATIONS

A. Abecker et al., "Information supply for business processes: coupling workflow with document analysis and information retrieval", Knowledge-based system, 2000, pp. 271-284.*

Alani, H., "TGVizTab: An Ontology Visualisation Extension for Protégé," Proceedings of Knowledge Capture, Workshop on Visualization Information in Knowledge Engineering, Sanibel Island, FL, 2003, pp. 1-6.

Andrews, Keith, M.D., "Techniques from the field of Information Visualisation and their Potential Application to the AURIS Project," *Information Visualisation for AURIS*, 2000.

Angeles, Pilar et al., "Detection and Resolution of Data Inconsistencies, and Data Integration using Data Quality Criteria," 2004, pp. 1-7.

Anokhin, P. et al., "Fusionplex: Resolution of Data Inconsistencies in the Integration of Heterogeneous Information Sources," Jan. 20, 2004, pp. 1-31.

Berendt, B., Hotho, A. Mladenic, D., van Someren, M., Spillopoulou, M., & Stumme, G. (2004). A Roadmap for Web Mining: From Web to Semantic Web. In Web Mining: From Web to Semantic Web url—citeseer.ist.psu.edu/762860.html.

Feldman, R. et al, "A Comparative Study of Information Extraction Strategies," 2002, pp. 1-12.

Fluit, C., et al., "Spectacle", *Towards the Semantic Web: Ontology-driven Knowledge Management*, 2003, John Wiley & Sons, Ltd., pp. 145-159.

Gertz, M., "Managing Data Quality and Integrity in Federated Databases," 2nd Annual IPIP TC-11 WG11.5 Working Conference on Integrity and Internal Control in Information Systems, Nov. 1998, pp. 1-19.

Green, S.J., "Building Hypertext Links by Computing Semantic Similarity" IEEE Transactions on Knowledge and Data Engineering, vol. 11, No. 5, Sep. 1999, pp. 713-730.

Jennings, M., "Enterprise Architecture View: Fingerprinting Data Warehouse Data," DMReview, Jan. 2003, pp. 1-4.

Kellogg, R.B., Subhas, M., "Text to hypertext: Can Clustering Solve the Problem in Digital Libraries?" Proceedings of $1^{st}$ ACM International Conference on Digital Libraries, Mar. 20, 1996, pp. 144-150.

Lamping, John, et al., "A Focus+Context Technique Based on Hyperbolic Geometry for Visualizing Large Hierarchies," to *Xerox Palo Alto Research Center*, printed Mar. 7, 2002.

Liongosari, Edy, et al., "In Search of a New Generation of Knowledge Management Applications," in *ACM SIGGROUP Bulletin*, (Jul. 1999).

Naumann, F., "From Databases to Information Systems Information Quality Makes the Difference," Proceedings of the International Conference on Information Quality, 2001, pp. 1-17.

Nguyen, Quang Vinh, and Huang, Mao Lin, "A Combined Visualization of Multiple Relational Structures in Shared Collaborative Workspaces," Multimedia Software Engineering, 2004 Proceedings. IEEE Sixth International Symposium on Miami, FL, Dec. 13, 2004, Piscataway, NJ, IEEE, Dec. 13, 2004, pp. 388-395.

Ponniah, P., "Data Warehousing Fundamentals: A Comprehensive Guide for IT Professionals,"2001, John Wiley & Sons, Inc., pp. 257-289.

Ponniah, Paulraj, "Data Extraction, Transformation, and Loading", *Data Warehousing Fundamentals: A Comprehensive Guide for IT*

*Professionals*, John Wiley & Sons, 2001 url =2223.interscience.wiley.com/cgi-bin/homepage/?isbn=0471221627 only p. 257-289.

Rennison, Earl, "Galaxy of News: An Approach to Visualizing and Understanding Expansive News Landscapes," in *UIST '94*, pp. 3-12, Nov. 2-4, 1994.

Seligman, L. et al., "XML's Impact on Databases and Data Sharing," Computer, IEEE Service Center, Los Alamitos, CA, vol. 34, No. 6, Jun. 2001, pp. 59-67.

Sheth A., et al., "Semantic Visualization: Interfaces for exploring and exploiting ontology, knowledgebase, heterogeneous content and complex relationships," NASA Virtual Iron Bird Workshop Mar. 31 and Apr. 2, Apr. 2004, pp. 1-9.

Sheth, A. et al,. "Semantic Content Management for Enterprises and the Web," Submitted for review for IEEE Internet Computing, 2002, pp. 1-19.

Sheth, A. et al., "Managing Semantic Content for the Web," IEEE Internet Computing, IEEE Service Center, New York, NY, Jul. 2002, pp. 80-87.

Sheth, A. et al., "Semantic Association Identification and Knowledge Discovery for National Security Applications," © Jan. 31, 2004, pp. 1-16.

Sheth, A. et al., "Semantic Enhancement Engine: A Modular Document Enhancement Platform for Semantic Applications Over Heterogeneous Content," To appear in *Real World Semantic Web Applications*, 2002, pp. 1-22.

Storey et al., "Jambalaya: Interactive visualization to enhance ontology authoring and knowledge acquisition in Protégé," 2001.

Sullivan, Dan, "Document Warehousing and Text Mining: Chapter 8: Loading and Transforming Documents", 2001, John Wiley & Sons.

Thuraisingham, B. et al., "Data Quality: Developments and Directions," *Integrity, Internal Control and Security in Information Systems. Connecting Governance and Technology*. IPIP TC11/WG11.5 Fourth Working Conference on Integrity and International Control in Information Systems, Kluwer Academic Publishers, Norwell, MA, USA, 2002, pp. 97-102.

U.S. Appl. No. 09/521,235, filed Mar. 8, 2000, Swaminathan, (non-publ).

* cited by examiner

NAVIGATING A SOFTWARE PROJECT RESPOSITORY

RELATED APPLICATIONS

The present patent document is a divisional of application Ser. No. 10/661,805 filed Sep. 12, 2003 now U.S. Pat. No. 7,383,269, which is incorporated herein in its entirety by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright® 2003, Accenture, All Rights Reserved.

BACKGROUND

1. Technical Field

The present invention relates generally to an improved method for organizing and presenting complex, detailed information stored in electronic form. The invention may find particular use in organizations that have a need to manage large repositories of documents containing related information. Typically, such organizations require changes in one document to be reflected in other related documents.

2. Background Information

Many complex projects—for example, software development, drug development and clinical trials, product development and testing etc.—involve the management of large heterogeneous document repositories. These repositories may contain thousands of documents of various types—text, spreadsheets, presentations, diagrams, programming code, ad-hoc databases etc—that have been created during different phases of the project lifecycle. Although the documents may be related to each other, the fact that they are of different formats and created during different phases of the project lifecycle makes it difficult to uncover the inter-relationships among the documents.

For a software project, a document repository may contain documents created throughout the project lifecycle. A typical software project lifecycle may be divided into at least four stages. First, project requirements are defined. The requirements relate to project goals, capabilities and limitations of the software system which the software project is to implement. Second, designs are built around the requirements. Design specifications form a plan for actually implementing a system which achieves the requirements previously defined. Next, the software code is written to reflect the design. Finally, testing is performed to verify the execution of the code and to determine if the requirements and design specifications are incorporated into the final application.

Therefore, the documents in the software project repository may detail project requirements, design criteria, programming code, test data, defect reports, code review reports, and the like. Furthermore, these documents are typically of varying types, such as the document types described above. Although many of these documents are inter-related, the size and heterogeneity of a typical repository make it difficult to find these inter-relationships. Technical problems also arise when attempting to find these inter-relationships across various types of files. In other words, typical document repositories do not allow for a high level of traceability.

Traceability is important to software project managers for two reasons. First, traceability allows a development team to quickly and easily perform impact analysis. Impact analysis is the process of determining which additional documents may be affected by a change in a given document. Second, traceability allows the project team to perform coverage analysis. Coverage analysis is the process of verifying that the design specification implements the project requirements and that the code, in turn, implements the design specification.

A lack of traceability leads to two types of business problems. One problem is poor software quality. This problem may occur because developers cannot easily determine if the software fulfills all requirements and has been tested against all test conditions or because the repository contains incompatible versions of requirements, design, code etc as the project evolves. A second problem is increased time and effort as the developers must manually determine the interrelations among documents.

Maintaining a consistent software project repository is a critical and well-researched problem in software engineering. In the past, systems have been created that allow developers in a large software project to manually create the inter-relationships among the various elements in the project repository. These commercial software development systems (Integrated Development Environments or IDEs) provide facilities for manually linking related items in the repository via explicit references. However, such an approach is not feasible in many cases for the following reasons: First, it is very time consuming. A typical repository may have thousands of documents, each covering multiple topics. Manually creating each link can cost a considerable number of man-hours. Second, a large software project may involve multiple teams, each focusing on different aspects of the project. For example, one team may determine the project requirements, another team may create the design specifications, a third team may build the code, a fourth team may develop test scripts and a fifth team may perform testing and quality assurance. These teams may be working in different locations, and may be affiliated with different companies. When creating a link in the code, the code builder may not realize the complete extent of his or her involvement in relation to the other teams. Thus, relevant links may never be created. Third, manually creating references causes the links to be brittle. Although a link may be accurate when created, later changes in the requirements or design specifications may create a need for new links or render old links 'dead.' Fourth, many large software projects evolve over a period of time, with new functions built over much older "legacy" components and technologies. In such cases a manual process is infeasible as there are few or no individuals who have a working knowledge of the older legacy components.

A second approach to maintaining a consistent software project repository has been to enforce a rigid development process and a rigid repository structure. While such an approach is applicable for a single team building the software system from start to finish under a single development methodology, it is impractical when the above team dynamics are present or when legacy systems are linked to current development projects. The present invention provides a robust technique for automatically discovering inter-relationships among the various elements in a large software repository that may contain thousands of documents of different formats created at various stages of the project lifecycle.

BRIEF SUMMARY

In one embodiment, a system including a document repository is provided. The system determines, automatically, a level of similarity between at least two of a plurality of discrete elements stored in the document repository. The system then stores data representative of a link between the elements based in-part on the level of similarity.

In another embodiment, a system including a document repository is provided. The system determines a relationship between documents by retrieving a plurality of documents from a document repository. The system segments at least two documents of the plurality of documents into a plurality of conceptually meaningful segments. The system determines if a segment of one document is related to a segment of another document and stores data representative of the relationship.

In a third embodiment, system for analyzing a document is provided. The system receives a document that includes data and a document type. The document type has an associated physical structure. The system determines a logical structure of the document based in part on the data and selects a subset of the data based on at least one of the group including the associated physical structure and the logical structure. The system also stores a document segment that includes the selected subset of the data.

These and other embodiments and aspects of the invention are described with reference to the noted Figures and the below detailed description of the preferred embodiments.

DETAILED DESCRIPTION OF THE DRAWINGS AND THE PRESENTLY PREFERRED EMBODIMENTS

Figure 1:
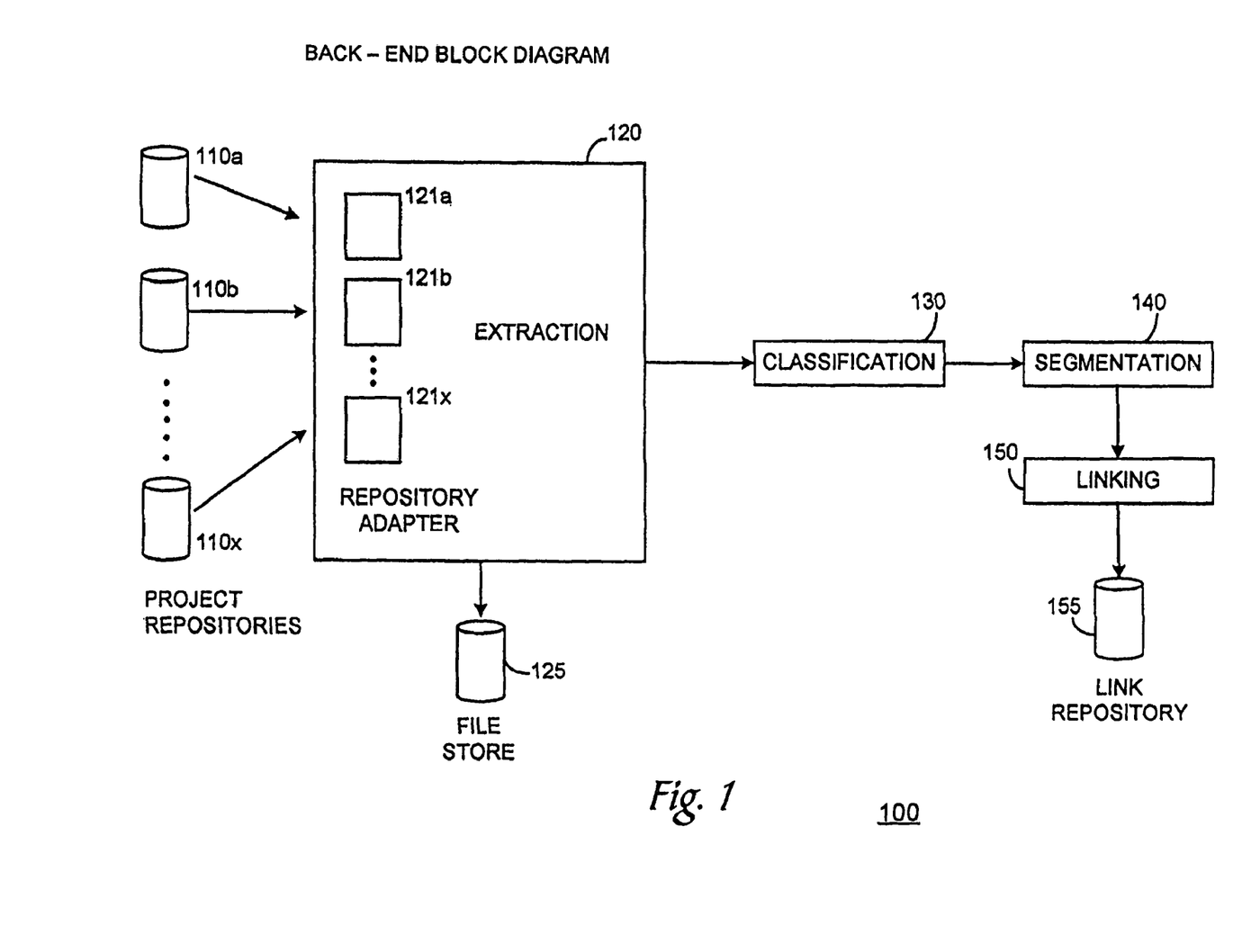
FIG. 1 is a diagram representative of an embodiment of a back-end for a repository navigation tool in accordance with the present invention.

Referring now to the drawings, and particularly to FIG. 1, there is shown an embodiment of a back-end system 100 for a repository navigation tool in accordance with the present invention. While the preferred embodiments disclosed herein contemplate a software development project and the documents created therein, the present invention is equally applicable to any document files created during the course of any project that has similar characteristics including multiple teams, multiple phases and a large volume of documents (and interrelationships among those documents) to manage. Examples of such projects include software development, drug development and clinical trials, product development and testing, managing a complex branding and marketing campaign etc.

The back-end system in the embodiment of FIG. 1 includes an extraction tool 120, a classification tool 130, a segmentation tool 140 and a linking tool 150. The extraction tool 120 extracts relevant files from a plurality of project repositories 110a, 110b, and 110x. Optionally, the extraction tool may store the extracted files in a file store 125 or other temporary storage means. Optionally, the classification tool 130 may classify the documents according to one or more predetermined categories. Once relevant files are extracted, the segmentation tool 140 segments the files into one or more segments. Finally, the linking tool 150 is provided to analyze the segments for inter-relationships. The linking tool may store this information about segment inter-relationships in a link repository 155.

In one embodiment, a plurality of project repositories 110a, 110b, and 110x are provided. As stated above, each repository may contain thousands of documents of various types—text, spreadsheets, presentations, diagrams, ad-hoc databases, programming code, etc—that have been created during different phases of a project lifecycle. In the embodiment of FIG. 1, each repository 110a, 110b and 110x may contain documents of any type, created during any stage of a project. A repository may also include files not created during a project lifecycle. It should be apparent to one of ordinary skill in the art that other repository structures are contemplated by the present invention. For example, one repository may be provided containing every document to be analyzed. In other embodiments, a plurality of repositories may be provided where each repository may contain only documents of certain types, created during certain phases of the project, or created at a certain geographical location.

The extraction tool 120 extracts relevant files from the various project repositories 110a, 110b, and 110x. In one embodiment, each repository has an associated repository type. The repository type defines the structure of the repository, such as the underlying directory structure for the repository. Additionally, the repository may be a simple repository consisting of a single directory, or a complex repository that may store metadata associated with each file kept in the repository. In one embodiment, the extraction tool 120 connects to each of the repositories 110a, 110b, and 110x through repository adapters 121a, 121b, and 121x. An adapter acts as an Application Programming Interface, or API, to the repository. For complex repositories, the repository adapter may allow for the extraction of metadata associated with the document.

A typical software project may involve requirements documents that are usually formatted text files that may be stored in a file structure; design and programming code may be stored within an Integrated Development Environment (IDE) such as Visual Source Safe (produced by Microsoft Corporation); test data may be stored within a test data management system such as Test Director (produced by Mercury Interactive corporation); defect reports and change requests may be stored in a change tracking system such as Clear Quest (by Rational Software Corporation). Although each of these systems constitutes a physically separate repository, the information in each repository has strong interrelationships to information in others. The repository adapters are interfaces to each physical repository that enables the extraction tool 120 to obtain the files and other meta-data from each physical repository and treat them as a single logical repository 125.

Optionally, the extraction tool 120 may include various parameters used to determine whether a document is relevant. These parameters may be predefined or configurable by a user. For example, a user may configure the extraction tool to only extract files from specified directories. It should be apparent to one of ordinary skill in the art that many other relevance parameters—for example, only certain file types or only files that have changed after a certain date—are contemplated by the present invention.

Figure 2:
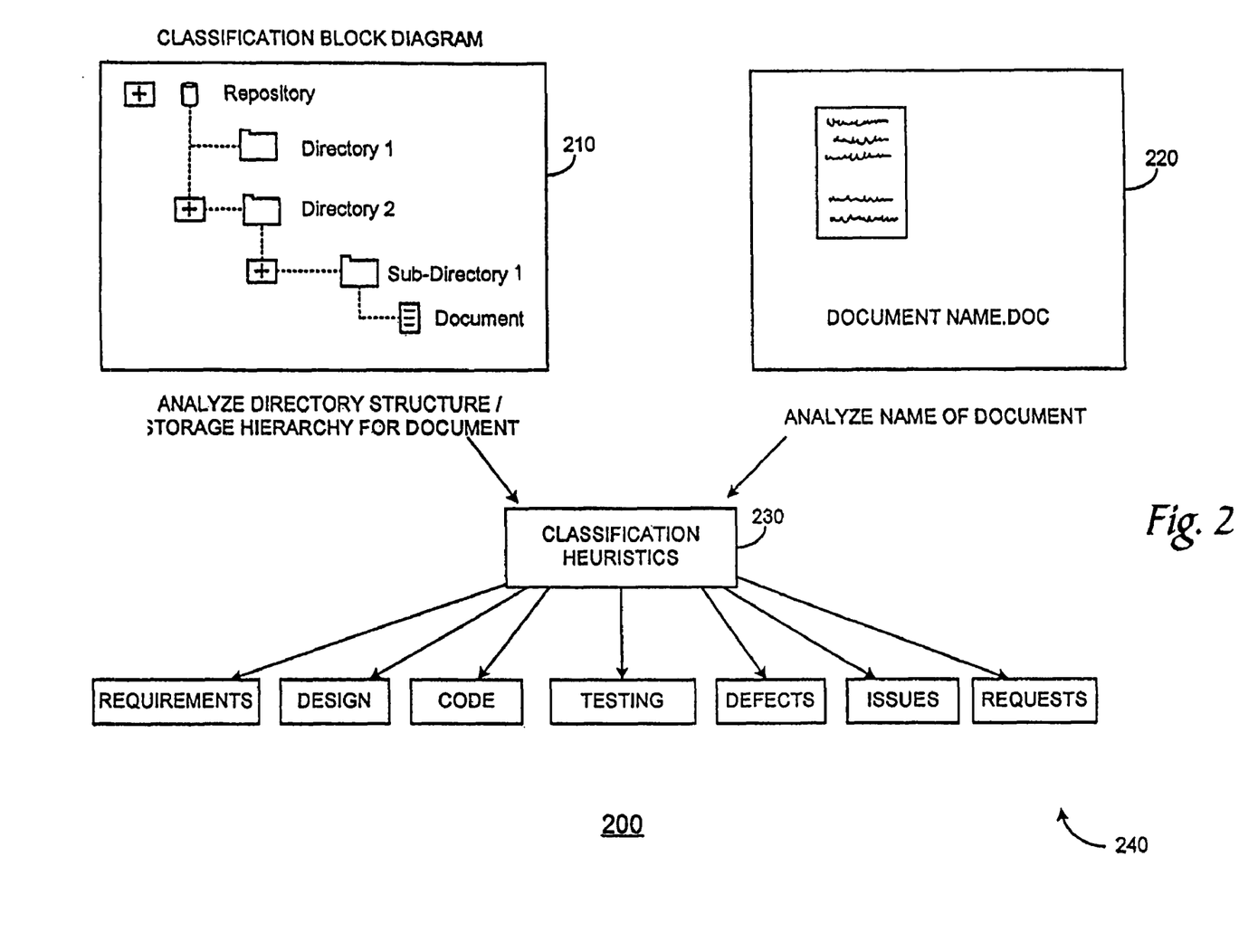
FIG. 2 is a diagram representative of a classification tool in accordance with the embodiment of FIG. 1.

Referring now to FIG. 2, one embodiment of the classification tool 130 is described in more detail. In the illustrated embodiment, the classification tool 130 implements several operational stages, including a storage hierarchy analyzer 210, document name analyzer 220 and document category analyzer 230. First, the classification tool 130 analyzes the structure of the various repositories 110*a*, 110*b*, and 110*x* at the storage hierarchy analyzer 210. Then, the classification tool 130 analyzes the name of the particular document being classified at the name analyzer 220. The document is then classified as belonging to one of a plurality of categories 240 of documents according to classification heuristics at the document category analyzer 230. In the embodiment of FIG. 2, exemplary categories include documents relating to requirements, design specifications, source code, testing, defects, outstanding issues, and additional requests.

As stated above, the repositories 110*a*, 110*b*, and 110*x* may be simple or complex, and may be used to store only certain types of documents. A particular repository, or particular directories in a repository, used to store particular documents is known as a rigidly structured repository. Preferably, the repositories 110*a*, 110*b*, and 110*x* are rigidly structured. The use of rigidly structured repositories reduces the number of assumptions made by the classification tool 130. For example, if all documents of a particular category are only stored in one repository, the classification tool 130 will only classify documents in that repository as belonging to that category. Similarly, the classification tool will more consistently categorize documents when strict document naming conventions are used. For example, category codes may be embedded into the name of a document.

Figure 3:
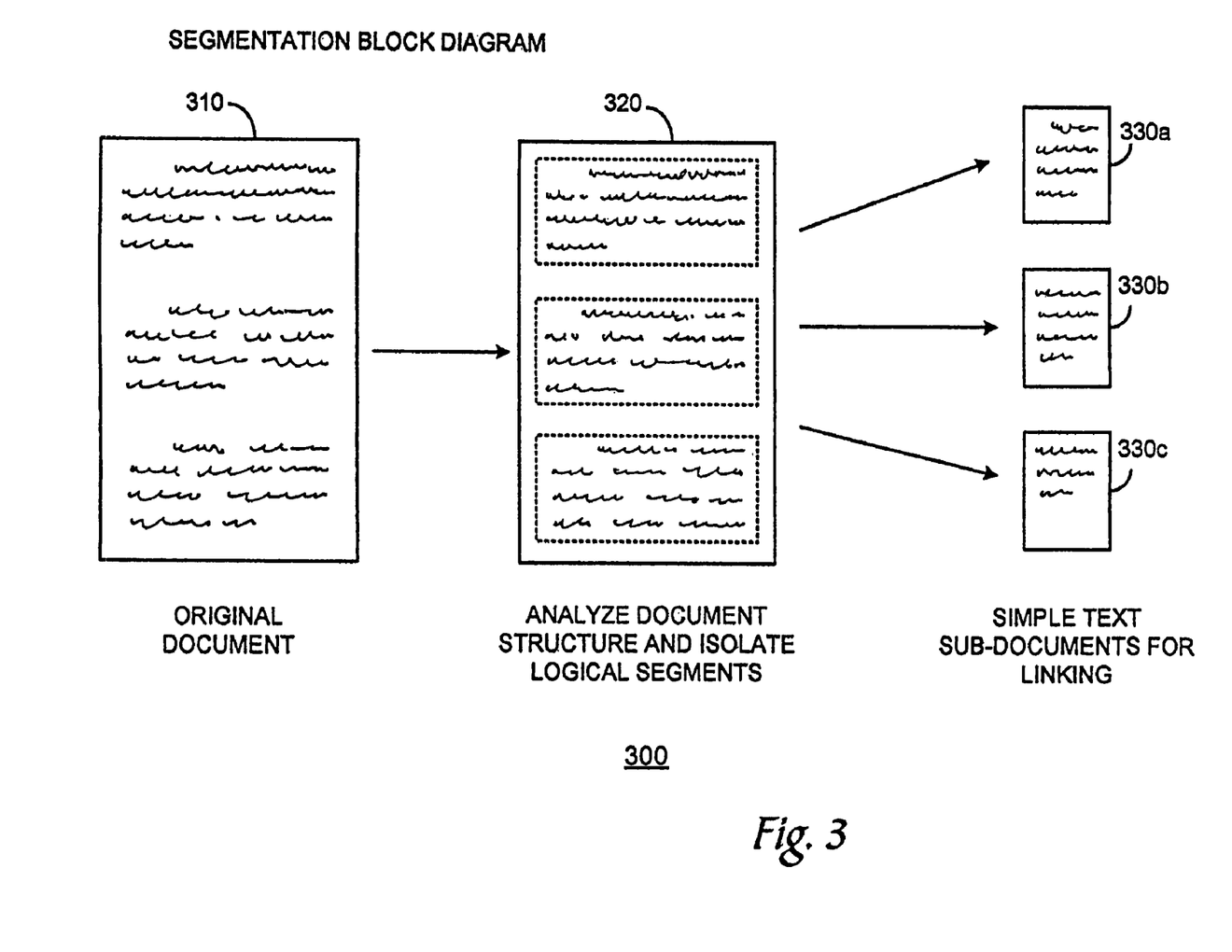
FIG. 3 is a diagram representative of a document segmentation tool in accordance with the embodiment of FIG. 1.

Referring now to FIG. 3, the segmentation tool 140 is described in more detail. The segmentation tool 130 analyzes the structure of the extracted documents 310 and isolates conceptually meaningful segments in the document 310 at box 320. Then, the extraction tool creates segments 330*a*, 330*b*, and 330*c* for further analysis. Segmentation is the process of analyzing the structure of the extracted documents 210 and breaking it into "conceptually meaningful segments". The term "conceptually meaningful segment," as used herein, refers to a subset of information in a document that is grouped together in some way and is well-delineated from surrounding information, signaling the author's intent to communicate to a reader that the subset is a single discrete piece information. For example, a requirements document may use a series of Sections (with numbers and titles) to record each discrete requirement; a document containing test data may use rows or columns in a spreadsheet to represent discrete test conditions or test "scripts"; design of different subsystems may be represented as individual slides of a presentation document. Real-world documents may also contain many other features to organize a document into discrete conceptually meaningful pieces of text. These features may include, for example, hierarchically organized chapters and sections, sidebars, embedded tables and so on, As stated above, each document 210 in the various repositories has an associated type. The type of document 210 is determined in one embodiment by the program used to create the document 210. For example, a document 210 may be created by Microsoft Word, provided by Microsoft Corporation of Redmond, Wash. Each document 210 created by Microsoft Word contains the same physical structure, or format. Each Word document also contains a collection of meta-data detailing various properties of the document 210, for example, the author of the document 210, creation date and other editing information. In other embodiments, or using other types of documents, the type of the document 210 may be defined differently.

Each document 210 also contains data elements, such as text characters, embedded images, formulas, and the like. These data elements define the content of the document 210. For example, a document 210 created by Microsoft Word may contain textual characters forming three sections. The first section may discuss topic A, the second section may discuss topic B, and the third section may discuss topic C.

The structure of a document 310 is determined at box 320 by analyzing the document type, the data elements, or both. Referring to the example above, the document 310 created by Word will have a standard format/structure common to all documents 310 created by Word, and a three section structure determined by the data elements. In one embodiment, the segmentation tool 140 will create three segments to reflect this structure. The structure of other types of document may be attributable solely to that document's type. For example, a presentation document may be segmented by pages or slides, or a database file by individual records.

The segmentation process is now illustrated using an example document shown in Table 1. This document, titled "Requirements for a Loan Servicing Application" is formatted using Microsoft Word (a word processing application developed by Microsoft Corporation of Redmond, Wash.). The segmentation tool 140 accesses the document from the logical repository 125. It first determines the document's file type as corresponding to that of Microsoft Word. Next, it uses Component Object Model (COM) Interface APIs for Microsoft Word to access the content and structure of the document. The tool retrieves the document's paragraph collection using the Document.GetParagraphs( ) method. Each paragraph in the collection is then accessed (using the Paragraphs.Item( ) method) and its relation to the outline structure of the document is determined by the Paragraph.GetOutlineLevel( ) method. The segmentation tool 140 now analyses the data from all of the paragraphs to determine that the outline consists of a document title and three sections—each section consisting of a section title and associated text. The segmentation tool 140 now concludes that the document contains three conceptually meaningful segments—each segment consisting of the section title and the section body. In one embodiment, the segmentation tool stores each of these segments as a text file that contains the overall document title, the section title and the text in the section body.

TABLE 1

Requirements for a Loan Servicing Application

1. Functional Requirements
   The Loan Servicing Application defined here will enable customers to interact with the company using a web-based interface. The interface TABLE 1-continued Requirements for a Loan Servicing Application will enable the customer to find out about interest rates, apply for loans, make payments or request payment credits.
2. Technical Requirements
The Loan Servicing Application will use a client-server architecture that consists of a webserver interacting with the corporate Oracle database and a Microsoft Exchange Mailserver. The loan servicing application will be implemented using Microsoft ASP technology and will cater to Microsoft Web Browsers version 4 and above.
3. Usability Requirements
The user interface must have two separate modes that cater to both expert and novice users. The novice user interface will provide extensive help and definition of terms used in the loan servicing application. The expert interface is meant to cater to frequent users of the system and will provide a one-click interface for most common customer functions.

It should be apparent to one of ordinary skill in the art that more complex document analysis is contemplated by the present invention. For example, a document 310 may be structured into five sections each of which has several subsections. The segmentation tool 140 may be configured to create a segment for each section or subsection of the document 310. The structure of other types of document may be attributable solely to that document's type. For example, a presentation document may be segmented by pages or slides, or a database file by individual records.

The process of segmentation is crucial for linking related pieces of information within a project repository. Since individual documents may be large and contain many discrete pieces of information, large documents will typically have some relationship to most other documents in the repository. In the worst case, a repository containing mostly large documents will exhibit relationships among every document. The process of segmentation isolates discrete pieces of information within a document so that only related pieces of information from different documents are linked to each other. This increases the specificity of the links and makes the links more accurate and useful for traceability and impact analyses.

Preferably, all documents 310 in the repositories 110a, 110b, and 110x are created using document templates. Templates are document 310 files with a preset format. Templates help the performance of the segmentation tool 140 by eliminating some uncertainty for the segmentation process. Where templates are used to create a document, the determination of a conceptually meaningful segment is more consistent. Templates allow the segmentation tool 140 to make assumptions about the document 310 that may not always be determined by analysis of the document type and data elements alone. For example, a requirements template may provide a table in which each requirement is represented as a row. In such a case, every row in a requirement document (that uses the template) constitutes a separate segment.

In one embodiment, the segmentation tool 140 analyzes the documents 310 through a document adapter. The document adapter acts as an API for a particular type of document 310 and facilitates the extraction of that document's 310 data elements. For example, an adapter for Microsoft PowerPoint (produced by Microsoft Corporation) uses the published API to access information within PowerPoint documents. The API consists of a set of Component Object Model (COM) interfaces that can be instantiated and queried to retrieve sets of slides, figures, shapes, and text. The adapter uses these COM objects to retrieve the collection of slides in the presentation. From that collection, individual slides can then be analyzed. On a given slide, text within shapes or other embedded figures is extracted from the document using the appropriate interfaces. For instance, the Shape.GetTextFrame( ) method returns the interface to a frame containing text. The TextFrame.GetTextRange( ) method returns a range of text and the TextRange.GetText( ) method returns the actual text contained within the shape. In this embodiment, the adapter treats individual slides as conceptually meaningful segments. Another exemplary adapter for Java code performs simple textual parsing of code documents and extracts class dependencies, methods, variables, and developer comments, creating conceptually meaningful segments from individual classes.

Figure 4:
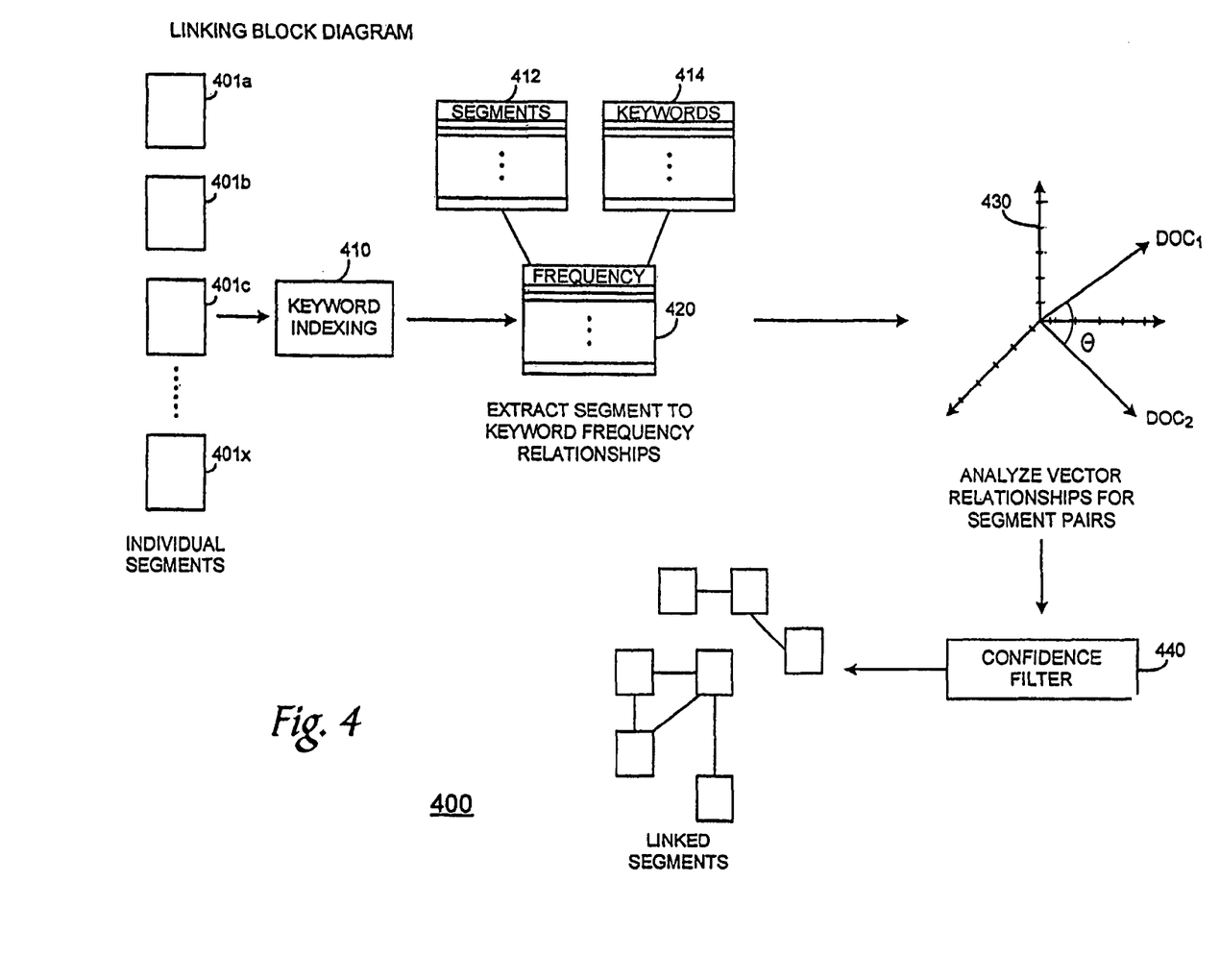
FIG. 4 a diagram representative of a segment linking tool in accordance with the embodiment of FIG. 1.

Referring now to FIG. 4, one embodiment of the linking tool 150 is described in more detail. It is preferred that linking tool 150 performs cosine similarity analysis on the segments. However, it should be apparent to one of ordinary skill in the art that any alternate method of similarity analysis is contemplated by the present invention, such as KL (Kullback-Leibler) divergence, Jaccard similarity, Euclidean similarity, Dice coefficients, and Information-theoretic similarity.

After the documents have been segmented, the linking tool 150 automatically determines relationships between the segments. In the embodiment of FIG. 4, the linking tool 150 includes a term extractor 410, a frequency table 420, a vector mapping function 430 and a confidence filter 440. The term extractor 410 extracts all terms (simple words as well as complex hyphenated words) except stopwords from a segment. Words that do not differentiate documents or that do not identify the information in a document are known as stopwords and include commonly occurring English words such as "the", "and", "or", "but", and so forth. The term extractor 410 generates a list of segments 412 and a list of terms 414. The list of terms 414 defines the vocabulary. In some embodiments, term extraction may be performed by an open source program. Once the segment list 412 and the term list 414 are complete, the frequency table 420 is created. The frequency table 420 contains information representative of the number of times each term is found in each segment.

Once the tables 412, 414 and 420 have been created, vectors are mapped onto an n-dimensional coordinate system by the vector mapping function 430, where n represents the vocabulary. A vector is created for each segment. The magnitude of each vector in a given direction m is determined by the frequency of that particular term m within the corresponding segment. The cosine of the angle between two vectors representing two segments determines the similarity between the two segments. The smaller the angle between the two vectors (and hence the larger the cosine), the more similar the segments. Two segments are considered identical if the angle between their vectors is 0° (or the cosine is 1). Two segments that have no common terms have an angle of 90° or cosine of 0. Cosines of the angles are calculated between every pairwise combination of vectors. In one embodiment, the values of these cosines are stored in a cosine table.

The confidence filter 440 is then applied. The confidence filter 440 acts to eliminate the statistically insignificant results. In one embodiment, the confidence filter will eliminate entries that do not meet a threshold value. Optionally, the confidence filter may include parameters that define threshold values. These parameters may be predefined or user configurable. If the cosine of the angle between two vectors exceeds the threshold, the corresponding segments are deemed related and data representative of a link between the two segments is stored in a link repository 155.

Figure 5:
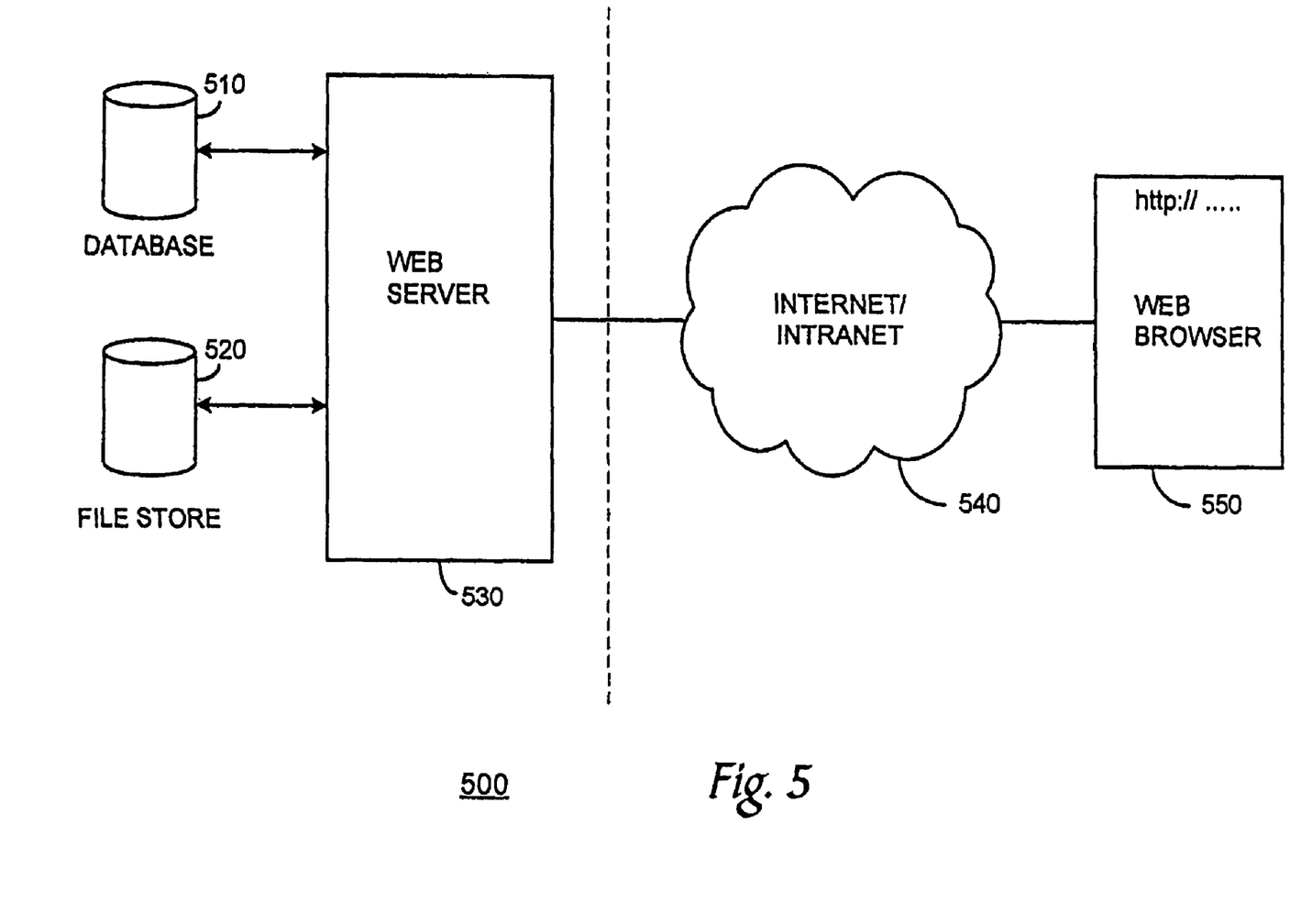
FIG. 5 is a diagram representative of a technical architecture for an embodiment of a front-end system for a repository navigation tool in accordance with the present invention.

Referring now to FIG. 5, an exemplary physical architecture 500 for a front-end system in accordance with the present invention is shown. The architecture 500 includes a database

510, a file store 520, a web server 530, an internet or intranet 540 and a web browser 550. In this embodiment, the database 510 contains the table of links generated by the back-end system of FIG. 1, and the file store 520 contains the documents extracted from the various repositories and documents comprising a user interface for the front-end system. The web server 530 is configured to make the database 510 and the file store 520 accessible via the Internet or a corporate intranet 540. Users wishing to access the front-end system can do so by opening a web browser 550 and accessing it through the Internet or a corporate Intranet 540.

Figure 6:
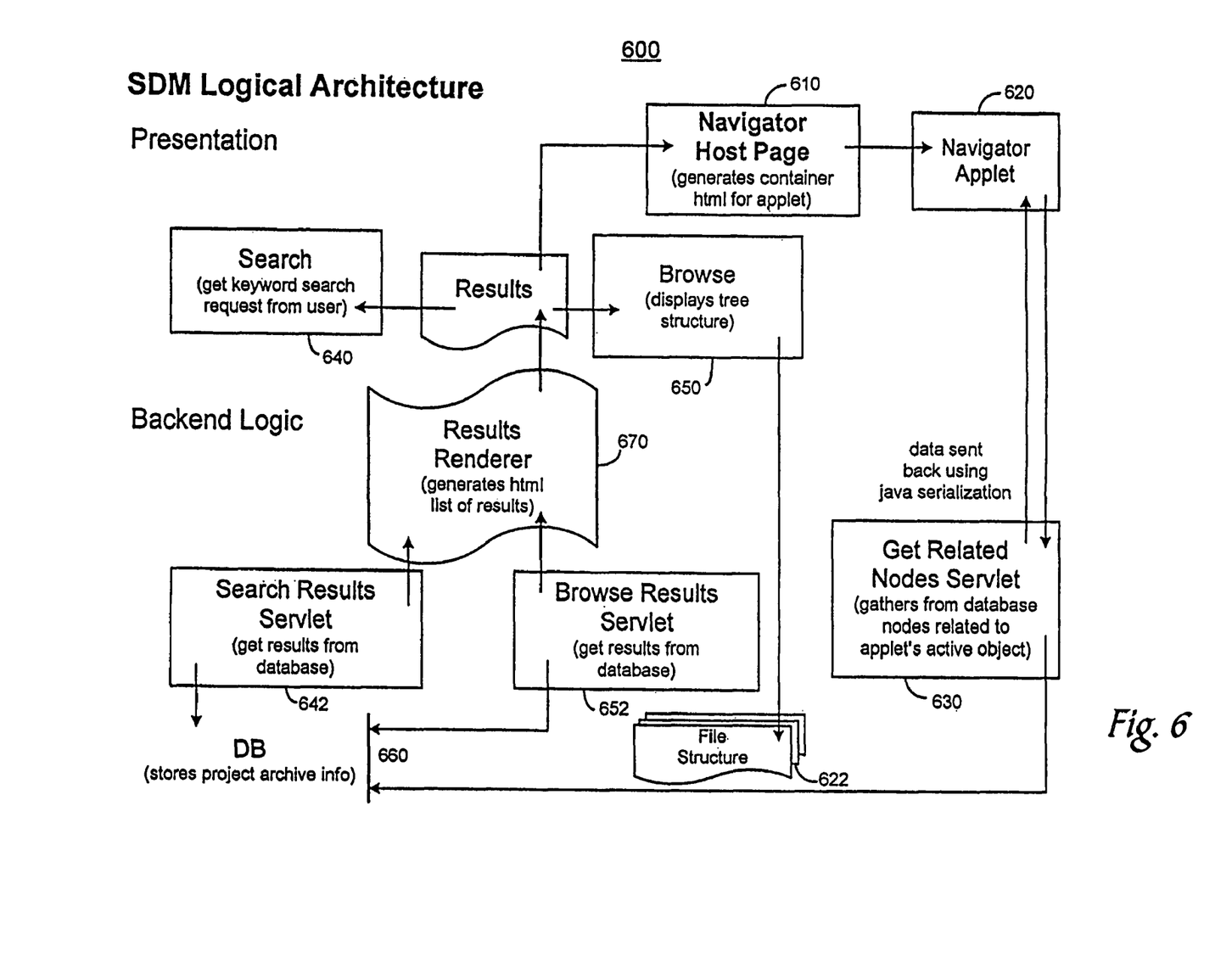
FIG. 6 is diagram representative of a logical architecture for the embodiment of FIG. 5.

Referring now to FIG. 6, it shows an exemplary logical architecture 600 for a front-end system in accordance with the embodiment of FIG. 5. As discussed above, users access the system by loading various documents in a web browser 550. In the embodiment of FIG. 6, the navigator host page 610 acts as an (HTML) container for the navigator applet 620. Preferably, the navigator applet 620 is a Java applet downloaded by a user and run from the web browser 550. The navigator applet 620 acts as a user interface for the back-end system 100 of FIG. 1. The navigator applet 620 provides access to the linked documents, provides search capabilities, and presents the results to the user. In other embodiments, the capabilities of the navigator applet 620 are incorporated into other types of web accessible documents or programs, such as HTML documents, ASP documents, and the like.

Once a user selects a particular document, the navigator applet 620 displays the segments linked to the selected segment by calling the Get Related Nodes Servlet 630. As known in the art, a servlet is a Java application that runs in a Web server or application server and provides server-side processing. The Get Related Nodes Servlet 630 queries the database 660, which stores the automatically determined links between the various segments and information tracking the document from which each segment was extracted. Once the necessary information is retrieved from the database 660, the Get Related Nodes Servlet 630 sends the information to the navigator applet 620, which displays the results to the user. The interface of the navigator applet 620 is discussed in more detail below in reference to FIG. 8.

Figure 7:
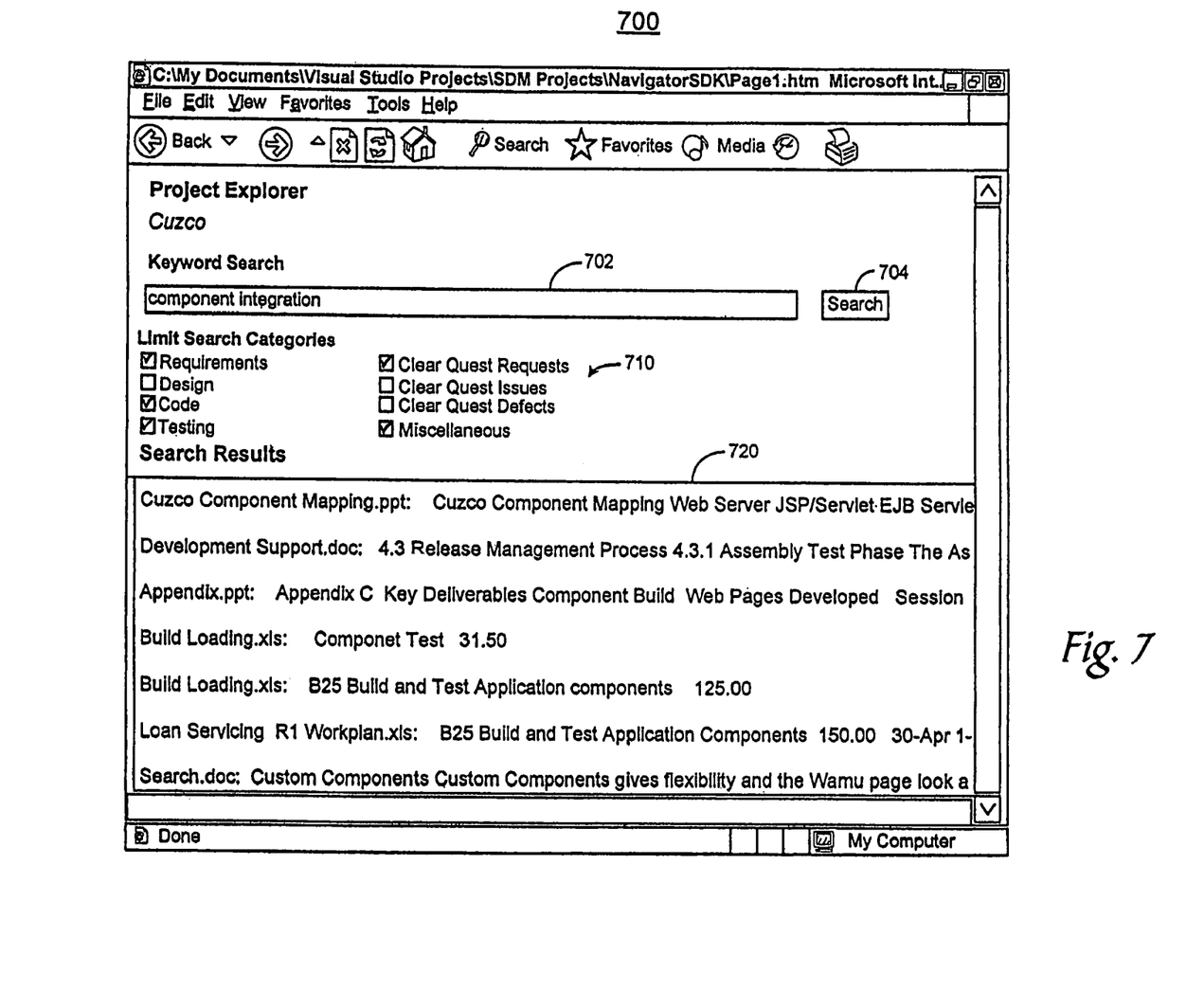
FIG. 7 is a diagram representative of an exemplary screenshot for an embodiment of a keyword search tool for the embodiment of FIG. 5.
Figure 9:
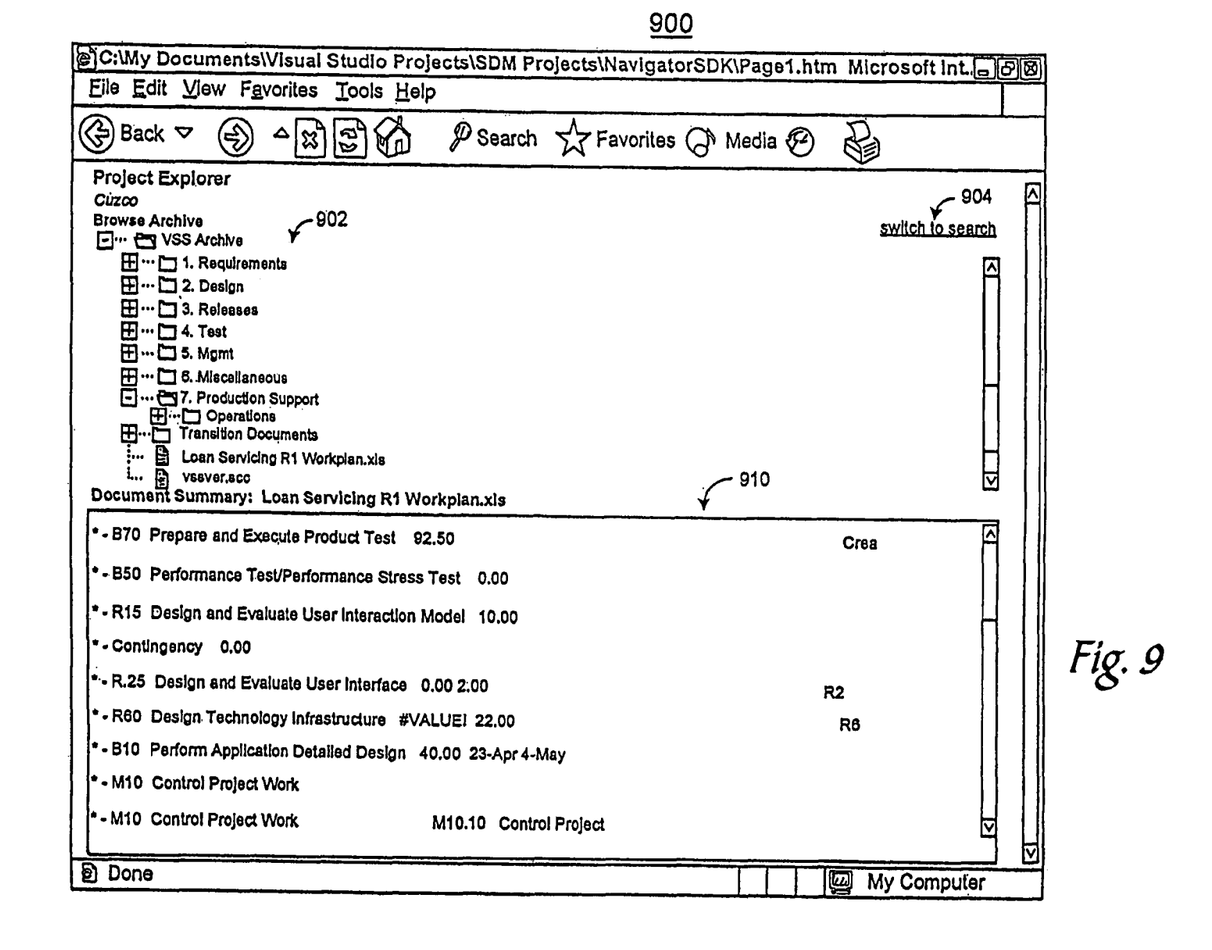
FIG. 9 is a diagram representative of an exemplary screenshot for an embodiment of a directory browser for the embodiment of FIG. 5.

The navigator applet 620 also allow a user to search 640 for documents by search terms or browse 660 through the directory structure of a repository and select a specific document. A user accesses the search tool 640 to search for a document by keyword. The search page collects search terms from the user and calls the SearchResults servlet 642. The SearchResults servlet queries the database 660 based on the collected search terms. The results are then passed to a Results Renderer 670 component, which generates an html list of the results and sends this document to the user's web browser.

Similarly, a user accesses the browse tool 650 to browse a repository for a document. The browse tool 650 allows a user to access the file structure 662 of a repository. The user then selects a document from the repository. Once a document is selected, the BrowseResults servlet 652 is called. The BrowseResult servlet 660 then queries the database 660 for documents related to the selected document. Once again, the results of the query are passed to the Results Renderer 670 component, which generates an html list of the results and sends this document to the user's web browser. The interface for these features will be discussed below in reference to FIGS. 7 and 9.

Referring now to FIG. 7, an exemplary screen-shot for an embodiment of a keyword search tool 700 for the embodiment of FIG. 5 is shown. The search tool 770 includes a text box 702, a search button 704, checkboxes 710 and results window 720. A user enters keywords into the text box 702, and activates the search button 704 to begin the search. Optionally, a user may limit the search to certain categories of documents by selecting the appropriate checkbox 710. Once the search button 704 is activated, the SearchResults servlet 642 (FIG. 6) is invoked, as discussed above. The results of the search are then displayed in results window 720 as a list of segments and the documents that contain them. Each segment listed is capable of being activated.

Figure 8:
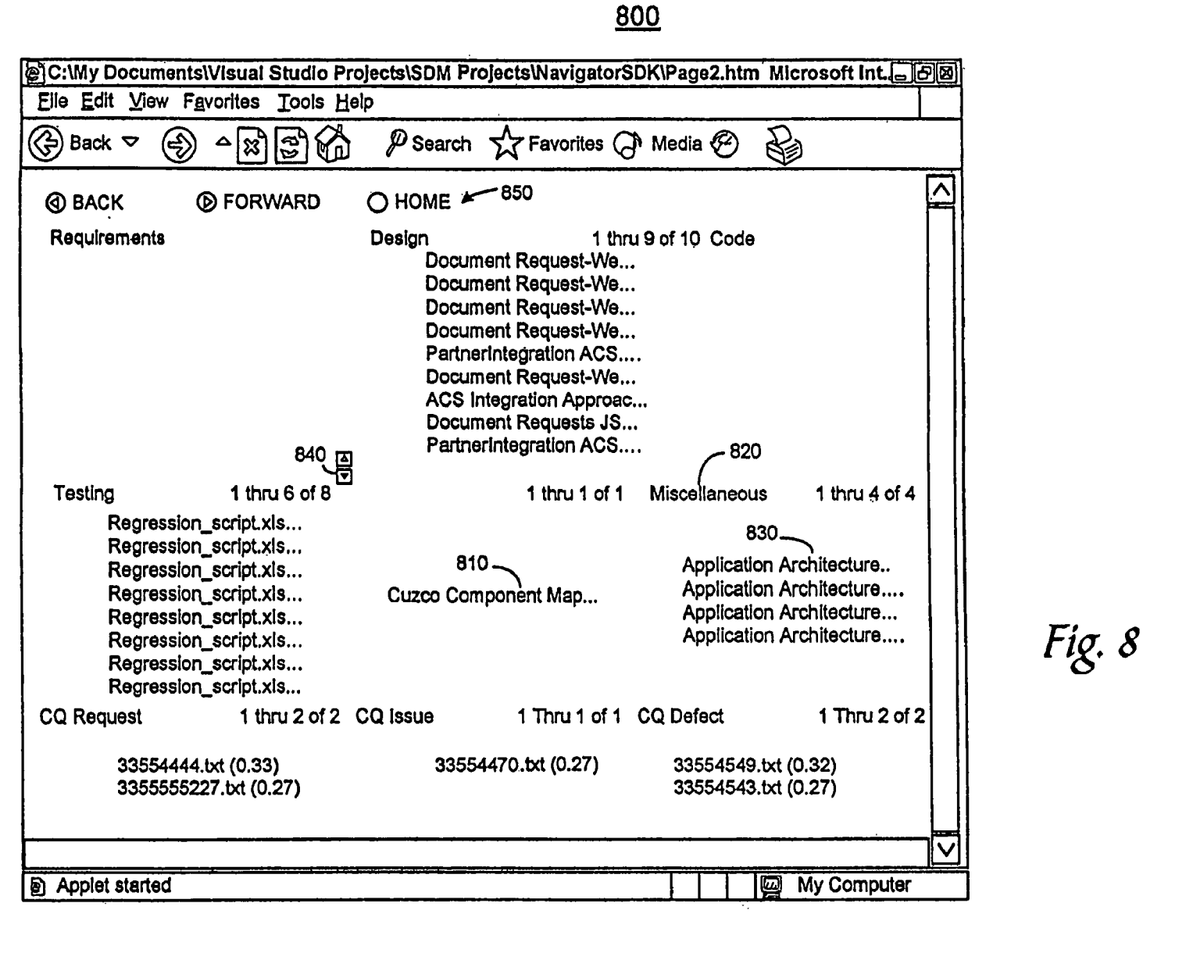
FIG. 8 is a diagram representative of an exemplary screenshot for an embodiment of a results page for the embodiment of FIG. 5.

Referring now to FIG. 8, an exemplary screen-shot for an embodiment of a results page 800 for the embodiment of FIG. 5 is shown. The results page 800 displays the segments related to an activated segment. Upon activating a segment from the results window 720 (FIG. 7), the results page 800 is displayed. In the embodiment of FIG. 8, the results page includes nine windows. The selected segment 810 is displayed in the center window. The remaining eight windows are used to display related segments 830 classified under a particular category 820. In other embodiments, the number of windows is adjusted so that a window exists for each document category.

In one embodiment, related segments 830 are displayed by document name. Where multiple related segments 830 have been extracted from a single document, it may appear as if the same related segment 830 is being displayed multiple times. In other embodiments, a segment identifier may be displayed to differentiate between related segments 830 extracted from the same document. Optionally, the calculated similarity of each related segment 830 to the selected segment 810 may be displayed. Where the total number of related segments 830 in a category exceeds the size of a window, navigation buttons 840 may be provided to allow a user to scroll through the list of related segments 830. Each related segment 830 is capable of being activated. Upon activation, the activated related segment 830 is displayed in the center window, the database is queried for those segments related to the activated related segment 830, and the results are displayed accordingly. Additionally, navigation buttons 850 may be provided to allow a user to revisit previously activated segments 810, and jump to a predetermined start page.

Referring now to FIG. 9, an exemplary screen-shot for an embodiment of a directory browser tool 900 for the embodiment of FIG. 5 is shown. The directory browser tool 900 includes a browse window 902, a search tool access link 904, and a results window 910. The browse window 902 displays the directory structure for a particular repository. A user can navigate through the directory and select a document. Once selected, the segments of that document are displayed in the results window 910. Optionally, a link 904 may be provided to allow a user to access the search tool 700 (FIG. 7). As above, each segment is capable of being activated. Upon activation, the segment is displayed in the results page 800 as described above.

From the foregoing, it can be seen that the embodiments disclosed herein provide an improved system and method for navigating a document repository in order to perform impact and coverage analysis. This system and method are particularly well adapted to situations where multiple teams located at various locations are working on a single project. The process of determining inter-relationships among the documents is automated so that, even in a project in which documents are created by multiple teams that do not employ consistent naming or storage conventions, the process can proceed without substantial involvement by technically trained personnel. The disclosed system discovers inter-relationships among the various elements in the repository and displays these relationships in an easy-to-use web page which may readily be operated by non-technical individuals. As a result, manually defined links among documents and the programmers required to create these links, are obviated. This substantially reduces the cost and time required for performing impact and coverage analysis.

It is therefore intended that the foregoing detailed description be regarded as illustrative rather than limiting, and that it be understood that it is the following claims, including all equivalents, that are intended to define the spirit and scope of this invention.

What is claimed is:

1. A method for analyzing a document in a computer system comprising:
   a) a backend system of the computer system, receiving, from one document repository of a plurality of document repositories, a document, the document including data and a document type, the document type having an associated physical structure;
   b) determining, with the backend system, a logical structure of the document based in part on the data;
   c) selecting, with the backend system, one or more conceptually meaningful segments within the document based on at least one of the document type and the physical structure; and
   d) storing, in a physical storage medium operatively connected to the back end system, a document segment, the document segment including the selected meaningful segments.

2. The method of claim 1, wherein selecting a subset of the data further comprises using an application programming interface to access the subset of data.

3. The method of claim 1, wherein receiving a document further comprises determining the document type.

4. The method of claim 3, wherein determining the document type further comprises selecting a document type from the group comprising a plain text document, a formatted text document, a presentation with discrete pages or slides, a diagram, a spreadsheet, programming code, a semi-structured document database, a text document with mark-up language tags, and a fully structured relational database.

5. The method of claim 3, wherein determining the document type further comprises analyzing the name of the document.

6. The method of claim 3, wherein determining the document type further comprises determining a category for the document.

7. The method of claim 6 wherein determining a category for the document further comprises selecting a category from the group comprising documents relating to requirements, documents relating to design specifications, documents relating to source code, documents relating to testing, documents relating to defects, documents relating to outstanding issues, and documents relating to additional requests.

8. The method of claim 1 wherein the selecting a subset of the data further comprises analyzing the structure of the document.

9. The method of claim 1 wherein the subset of the data is a discrete conceptually meaningful piece of information.

10. The method of claim 1 wherein storing a document segment further comprises storing the document segment as a text file.

11. A system for analyzing a document, the system comprising:
   a) a receiving tool, that utilizes one of a plurality of Application Programming Interfaces (APIs) in a backend system of the system, to receive a document, wherein the document has an associated document type and physical structure, from one of a plurality of document repositories;
   b) an analyzing tool for determining, in the backend system, a logical structure of the document based in part on the data;
   c) a segmentation tool, that utilizes at least one of the plurality of APIs in the backend system, to identify and select one or more conceptually meaningful segments within the document based on at least one of the document type and the physical structure; and
   d) a storing tool for storing, in a physical storage medium operatively connected to the backend system, a document segment.

* * * * *